(12) United States Patent
Salamone et al.

(10) Patent No.: US 7,576,159 B2
(45) Date of Patent: Aug. 18, 2009

(54) GAS-PERMEABLE MATERIALS AND MEDICAL DEVICES

(75) Inventors: Joseph C. Salamone, Boca Raton, FL (US); Jay F. Kunzler, Canandaigua, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 533 days.

(21) Appl. No.: 11/413,907

(22) Filed: Apr. 28, 2006

(65) Prior Publication Data
US 2007/0255014 A1 Nov. 1, 2007

(51) Int. Cl.
*C08F 281/00* (2006.01)
*C08F 283/12* (2006.01)
*C08F 290/06* (2006.01)
*C08F 38/00* (2006.01)

(52) U.S. Cl. .................. 525/69; 525/477; 525/275
(58) Field of Classification Search .............. 525/477
See application file for complete search history.

(56) References Cited

U.S. PATENT DOCUMENTS

| | | | |
|---|---|---|---|
| 4,136,250 A | 1/1979 | Mueller et al. | |
| 4,143,949 A | 3/1979 | Chen | |
| 4,153,641 A | 5/1979 | Deichert et al. | |
| 4,312,575 A | 1/1982 | Peyman et al. | |
| 4,327,203 A | 4/1982 | Deichert et al. | |
| 4,355,147 A | 10/1982 | Deichert et al. | |
| 4,755,561 A | 7/1988 | Matsui et al. | |
| 4,767,797 A | 8/1988 | Ai et al. | |
| 4,910,277 A | 3/1990 | Bambury et al. | |
| 4,954,587 A | 9/1990 | Mueller | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,260,000 A | 11/1993 | Nandu et al. | |
| 5,270,418 A | 12/1993 | Kunzler et al. | |
| 5,310,779 A | 5/1994 | Lai | |
| 5,331,067 A | 7/1994 | Seidner et al. | |
| 5,358,995 A | 10/1994 | Lai et al. | |
| 5,464,667 A | 11/1995 | Kohler et al. | |
| 5,470,932 A | 11/1995 | Jinkerson | |
| 5,945,498 A | 8/1999 | Hopken et al. | |
| 6,043,328 A | 3/2000 | Domschke et al. | |
| 6,878,792 B2 * | 4/2005 | Ichinohe ............... | 528/28 |
| 6,902,812 B2 | 6/2005 | Valint et al. | |

FOREIGN PATENT DOCUMENTS

JP 63086725 A * 4/1988
JP 63086726 A * 4/1988

OTHER PUBLICATIONS

Mark et al. Mark, Herman, et al, eds. Encyclopedia of Polymer Science and Engineering, 2nd edition, Acetylenic Polymers, vol. 1, pp. 116-119. J. Wiley & Sons: New York, NY, 1985.*
Masuda et al., "Poly[1-(trimethylsilyl)-1-propyne]: A New High Polymer Synthesized with Transition-Metal Catalysts and Characterized by Extremely High Gas Permeability," J. Am. Chem. Soc., American Chemical Society, 1983, p. 7473-7474.
Takada et al., "Gas Permeability of Polyacetylenes Carrying Substituents," J. of App. Poly. Sci., John Wiley & Sons, Inc., 1985, p. 1605-1616.
Lai, "The Role of Bulky Polysiloxanylalkyl Methacrylates in Polyurethane-Polysiloxane Hydrogels," J. of App. Sci., John Wiley & Sons, Inc., 1996, p. 1193-1199.

* cited by examiner

*Primary Examiner*—Randy Gulakowski
*Assistant Examiner*—Michael Dollinger
(74) *Attorney, Agent, or Firm*—Joseph Barrera

(57) ABSTRACT

Gas-permeable polymeric materials comprise poly(disubstituted acetylene) and a siloxanyl-based polymer. Medical devices, such as ophthalmic devices, are manufactured from such gas-permeable materials.

31 Claims, No Drawings

GAS-PERMEABLE MATERIALS AND MEDICAL DEVICES

BACKGROUND OF THE INVENTION

The present invention relates to gas-permeable polymeric materials and medical devices comprising the same. In particular, the present invention relates to rigid, gas-permeable ophthalmic devices comprising poly(disubstituted acetylene).

Advances in the chemistry of materials for medical devices have increased their compatibility with a body environment and their comfort for extended use therein. The extended use of ophthalmic devices, such as contact lenses, requires that materials for these lenses allow sufficient rates of transport of oxygen to the cornea to preserve its health because the cornea does not have blood vessels for the supply of oxygen and must receive this gas by its diffusion through the epithelial layer on the outer surface of the cornea.

Most contact lenses fall under two basic categories: rigid lenses and soft lenses. Many lens wearers feel that soft lenses provide better comfort. These lenses are typically made of hydrogel materials, which are polymeric materials capable of retaining a high equilibrium water content. Generally, the higher the water content, the more oxygen reaches the cornea. However, soft lenses having very high water content are difficult to handle. Thus, there may be a practical limit to the oxygen permeability through these lenses. Most soft contact lenses have oxygen permeability (denoted by "Dk" in the contact lens art) in the range of about 60-70 barrers (or $10^{-10}$ ($cm^3$ $O_2$ (at STP)·cm)/($cm^2$·sec·cm Hg)).

On the other hand, certain severe vision defects, such as astigmatism or keratoconus, are better corrected with rigid contact lenses because the materials of these lenses allow for more precise manufacturing and the lenses retain their shapes for a substantially long period. In addition, since the equilibrium water content of rigid, gas-permeable ("RGP") materials is low, RGP lenses tend not to pull water away from the eye, thus lessen the risk of causing dry eye. The newer RGP lenses can have both some flexibility and gas permeability that is higher than that of soft contact lenses. In order to provide flexibility, polymeric materials of these newer RGP lenses typically include polysiloxane segments that comprise bulky siloxy units such as TRIS (3-methacryloyloxypropyl-tris(trimethylsiloxy)silane or tris(trimethylsiloxy)silylpropyl methacrylate) or fluorinated siloxy units. Oxygen permeability of about 140 barrers or more can be achieved with these materials. However, polysiloxanes are typically highly hydrophobic and lipophilic. The properties (e.g., lipophilicity, glass transition temperature, mechanical properties) of known polysiloxanes have resulted in contact lenses that adhere to the eye, inhibiting the necessary lens movement. In addition, polysiloxane lipophilicity promotes adhesion to the lens of lipids and proteins in the tear fluid, causing a haze, which interferes with vision through the lens. Finally, as with any family of materials, a limit in oxygen permeability may be reached eventually with these siloxane-based materials.

Therefore, there is a continued need to provide other materials for RGP lenses with improved oxygen permeability. In addition, it is very desirable to provide RGP lenses having improved oxygen permeability and surface wettability.

BRIEF SUMMARY OF THE INVENTION

In general, the present invention provides polymeric materials that have improved gas permeability and medical devices comprising such materials.

In one aspect, the present invention provides ophthalmic devices having improved oxygen permeability.

In another aspect, the present invention provides RGP contact lenses having improved oxygen permeability.

In still another aspect, said RGP contact lenses comprise poly(disubstituted acetylene).

In yet another aspect, at least some of the repeating units of the poly(disubstituted acetylene) of the present invention comprise at least a substituted silyl group.

In a further aspect, the poly(disubstituted acetylene) of the present invention has a formula of

(I)

wherein the groups $R^1$ of different repeating units are independently selected from the group consisting of lower alkyl (as defined below), substituted lower alkyl, $C_{6-36}$ aryl, and $C_{6-36}$ substituted aryl; $R^2$ comprises a substituted silyl group having a formula of

(II)

wherein $R^3$, $R^4$, and $R^5$ are independently selected from the group consisting of lower alkyl, substituted lower alkyl, $C_{6-36}$ aryl, and $C_{6-36}$ substituted aryl; and n is a positive integer in the range from about 20 to about 500.

In yet another aspect, the present invention provides a composition for making a gas-permeable ophthalmic device. The composition comprises a poly(disubstituted acetylene) having Formula I and at least a siloxanyl-based monomer.

In still another aspect, the present invention provides a polymeric material for making a gas-permeable ophthalmic device. The polymeric material comprises a poly(disubstituted acetylene) having Formula I and a siloxanyl-based polymer.

In a further aspect, the present invention provides a method for making a gas-permeable ophthalmic device. The method comprises effecting a polymerization of a composition that comprises a poly(disubstituted acetylene) having Formula I and at least a siloxanyl-based monomer to form the gas-permeable ophthalmic device.

Other features and advantages of the present invention will become apparent from the following detailed description and claims.

DETAILED DESCRIPTION

The term "lower alkyl" means an alkyl group having any number of carbon atoms from 1 to, and including, 10 (e.g., 1, 2, 3, 4, 5, 6, 7, 8, 9, or 10). A lower alkyl group can be a linear (e.g., having 1-10 carbon atoms), branched (e.g., having 3-10 carbon atoms), or cyclic (e.g., having 3-10 carbon atoms) alkyl.

The phrase "from i to j" (wherein i and j are any integers), as used herein in connection with a range of integers, means the range from i to j, including i and j.

The term "(meth)acrylate" includes acrylate and methacrylate. Similar meanings apply to other analogous terms of "(meth)acrylate."

In general, the present invention provides polymeric materials that have improved gas permeability and medical devices comprising such materials.

In one aspect, the present invention provides ophthalmic devices having improved oxygen permeability. In one embodiment, the ophthalmic devices of the present invention have oxygen permeability greater than about 140 barrers. In another embodiment, the ophthalmic devices of the present invention have oxygen permeability in the range from about 140 to about 1000 barrers. Alternatively, the ophthalmic devices of the present invention have oxygen permeability in the range from about 140 to about 800 barrers, or from about 140 to about 600 barrers, or from about 160 to about 500 barrers, or from about 160 to about 400 barrers, or from about 160 to about 300 barrers.

In another aspect, said ophthalmic devices comprise poly(disubstituted acetylene).

In still another aspect, said ophthalmic devices comprise poly(disubstituted acetylene) and a siloxanyl-based polymer.

In still another aspect, said poly(disubstituted acetylene) comprises from about 1 to about 99 weight percent of the ophthalmic device. Alternatively, said poly(disubstituted acetylene) comprises from about 10 to about 80 (or from about 20 to 70, or from about 20 to about 50, or from about 20 to about 40, or from about 20 to about 30, or from about 30 to about 70, or from about 30 to about 60) weight percent of the ophthalmic device.

In yet another aspect, at least some of the repeating units of the poly(disubstituted acetylene) of the present invention comprise at least a substituted silyl group.

In a further aspect, the poly(disubstituted acetylene) of the present invention has a formula of

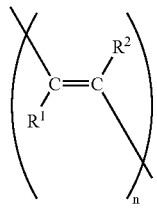

(I)

wherein the group $R^1$ of different repeating units is independently selected from the group consisting of lower alkyl, substituted lower alkyl, $C_{6-36}$ aryl, and $C_{6-36}$ substituted aryl; $R^2$ comprises a substituted silyl group having a formula of

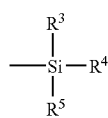

(II)

wherein $R^3$, $R^4$, and $R^5$ are independently selected from the group consisting of lower alkyl, substituted lower alkyl, $C_{6-36}$ aryl, and $C_{6-36}$ substituted aryl; and n is a positive integer in the range from about 20 to about 500. In one embodiment, n is in the range from about 20 to about 400, or from about 20 to about 300, or from about 50 to about 300, or from about 80 to 200.

In one aspect, said aryl groups are selected from the group consisting of unsubstituted and substituted phenyl, biphenyl, naphthyl, benzyl, anthryl, and combinations thereof.

In one embodiment, at least some of the $R^1$ groups are the methyl group, and some other $R^1$ groups are the phenyl group. In another embodiment, the $R^3$, $R^4$, and $R^5$ groups are selected from the group consisting of methyl and phenyl groups.

In still another embodiment, at least some of the $R^1$ groups are partially or completely halogenated methyl, such as partially or completely chlorinated, brominated, fluorinated, or iodinated methyl. In yet another embodiment, $R^1$ is trifluoromethyl.

In an alternate embodiment, $R^1$, $R^3$, $R^4$, and $R^5$ are the methyl group and the poly(disubstituted acetylene) is poly(trimethylsilylpropyne). Other non-limiting examples of poly(disubstituted acetylene) include poly(ethyldimethylsilylpropyne), poly(propyldimethylsilylpropyne), poly(triethylsilylpropyne), poly(3,3,3-trifluoropropyildimethylsilylpropyne), poly(3,3,3-trifluoropropyldiethylsilylpropyne), poly(trimethylsilylmethyildimethylsilylpropyne), poly(trimethylsilylethyldimethylsilylpropyne), poly(phenyldimethylsilylpropyne), poly(pentafluorophenyldimethylsilylpropyne), poly(β-phenylethyldimethylsilylpropyne), poly(phenyldiethylsilylpropyne), and a copolymer therefrom which is composed of two or more repeating units of the polymers listed above.

The poly(disubstituted acetylene) comprising the repeating units that are represented by the general Formula I can be prepared by polymerization of one or more disubstituted acetylenes as starting material in an organic solvent usually at a temperature in the range from about 30° C. to about 100° C. for about 10 minutes to about 36 hours. The polymerization reaction is carried out in the presence of a halide of tantalum or niobium, such as tantalum pentachloride, niobium pentachloride, tantalum pentabromide, niobium pentabromide as catalyst. With regard to solvent, aromatic hydrocarbons such as benzene, toluene, and xylene, alicyclic hydrocarbons such as cyclohexane, and chlorinated solvents such as chloroform, 1,2-dichloroethane and carbon tetrachloride may be used. In addition to the main catalysts referred to above, a second component of the catalyst selected from organometallic compounds that contain aluminum, silicon, tin, and antimony may be used as co-catalyst to produce the desired polymer. Examples of the organometallic compounds are trimethylaluminum, triethylaluminum, hydrosilane derivatives, tetraphenyltin, tetra-n-butyltin, and triphenylantimony.

In another aspect, the present invention provides a composition for making gas-permeable ophthalmic devices, such as contact lenses or RGP contact lenses. The composition comprises a poly(disubstituted acetylene) having Formula I and at least a siloxanyl-based monomer. The term "siloxanyl" means a group that comprises at least a silicon-oxygen-silicon bond. The term "monomer" includes macromonomers. In a preferred embodiment, the siloxanyl-based monomer is in the liquid state at room temperature and about 1 atmosphere.

In various embodiments, specific $R^1$, $R^2$, $R^3$, $R^4$, and $R^5$ groups are as disclosed above.

Non-limiting examples of siloxanyl-based monomers, which comprises the second component of a composition of the present invention, include vinyl-, (meth)acrylate-, hydride-, epoxy-, hydroxyl-, amino-terminated oligosiloxanes or polysiloxanes. In one embodiment, the number of repeating siloxy units is in the range from about 1 to about 20 (or alternatively, from about 1 to 10). These siloxanyl-based monomers are commercially available, for example, from Gelest, Inc. (Morrisville, Pa.). In a preferred embodiment, the functionalized oligosiloxanes or polysiloxanes are in a liquid state at room temperature and about 1 atmosphere. In another embodiment, the substituents on the silicon atom of the siloxy units are independently selected from the group consisting of substituted and unsubstituted lower alkyl and substituted and unsubstituted $C_{6-36}$ aryl groups (or alternatively, $C_{6-10}$ aryl groups) to adjust the refractive index of the final polymeric material. In one embodiment, the substituents on the silicon atom of the siloxy units are independently selected from the group consisting of substituted and unsubstituted $C_{1-3}$ alkyl, phenyl, and substituted phenyl.

Other applicable siloxanyl-based (or siloxane-containing) monomeric units for use in a composition of the present invention are disclosed, for example, in U.S. Pat. Nos. 4,136, 250; 4,153,641; 5,034,461; 5,070,215; 5,260,000; 5,310,779; and 5,358,995; the contents of which are incorporated herein by reference in their entirety.

Other non-limiting examples of applicable siloxane-containing monomeric units include bulky siloxanylalkyl (meth) acrylic monomers. The term "(meth)acrylic" means methacrylic or acrylic, depending on whether the term "meth" is present or absent. An example of bulky siloxanylalkyl (meth) acrylic monomers are represented by the following Formula III:

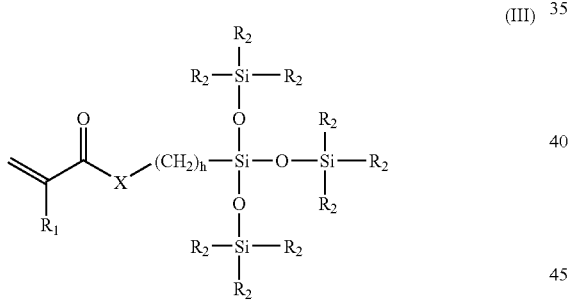

(III)

wherein X denotes —O— or —NR—; each $R_1$ independently denotes hydrogen or methyl; each $R_2$ independently denotes a lower alkyl radical, phenyl radical or a group represented by

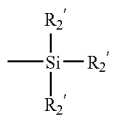

wherein each $R'_2$ independently denotes a lower alkyl, fluoroalkyl, or phenyl radical; and h is 1 to 10.

A suitable bulky monomer is 3-methacryloyloxypropyltris (trimethyl-siloxy)silane or tris(trimethylsiloxy)silylpropyl methacrylate ("TRIS").

Another class of representative silicon-containing monomers includes silicone-containing vinyl carbonate or vinyl carbamate monomers such as: 1,3-bis{4-(vinyloxycarbonyloxy)but-1-yl}tetramethyldisiloxane; 3-(trimethylsilyl)propyl vinyl carbonate; 3-(vinyloxycarbonylthio)propyl-{tris (trimethylsiloxy)silane}; 3-{tris(trimethylsiloxy) silyl}propyl vinyl carbamate; 3-{tris(trimethylsiloxy) silyl}propyl allyl carbamate; 3-{tris(trimethylsiloxy) silyl}propyl vinyl carbonate; t-butyldimethylsiloxyethyl vinyl carbonate; trimethylsilylethyl vinyl carbonate; and trimethylsilylmethyl vinyl carbonate.

An example of silicon-containing vinyl carbonate or vinyl carbamate monomers are represented by Formula IV:

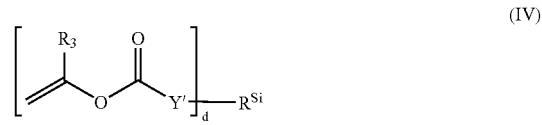

(IV)

wherein:
Y' denotes —O—, —S— or —NH—;
$R^{Si}$ denotes a silicon-containing organic radical;
$R_3$ denotes hydrogen or methyl; and
d is 1, 2, 3 or 4.

Suitable silicon-containing organic radicals $R^{Si}$ include the following:

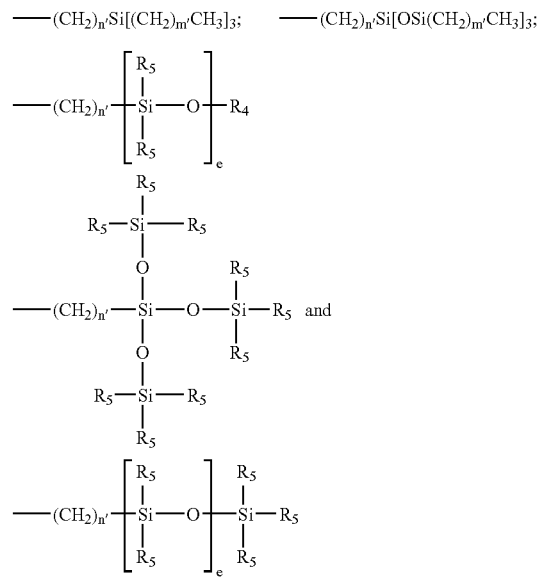

wherein
R4 denotes

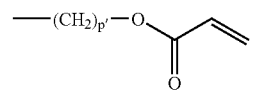

wherein p' is from 1 to and including 6;
$R_5$ denotes an alkyl radical or a fluoroalkyl radical having from 1 to and including 6 carbon atoms;
e is 1 to 200; n' is 1, 2, 3 or 4; and m' is 0, 1, 2, 3, 4 or 5.

An example of a particular species within Formula IV is represented by Formula V.

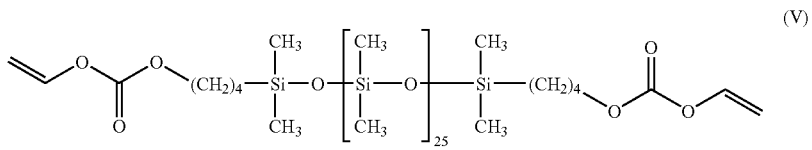

(V)

Another class of silicon-containing monomer includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193-1199 (1996). U.S. Pat. Nos. 5,945,498 and 6,043,328 also disclose examples of this class of monomers, these patents are hereby incorporated by reference in their entirety. Further examples of silicone urethane monomers are represented by Formulas VI and VII:

(VI)

or

(VII), wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureylene linkage;

a is at least 1;

A denotes a divalent polymeric radical of Formula VIII:

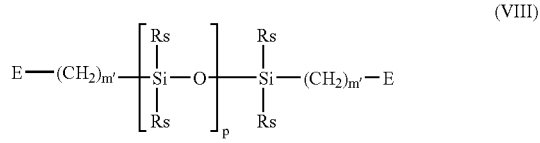
(VIII)

wherein:

each $R_s$ independently denotes an alkyl or fluoro-substituted alkyl group having 1 to 10 carbon atoms which may contain ether linkages between carbon atoms;

m' is at least 1; and p is a number which provides a moiety weight of 400 to 10,000;

each of E and E' independently denotes a polymerizable unsaturated organic radical represented by Formula IX:

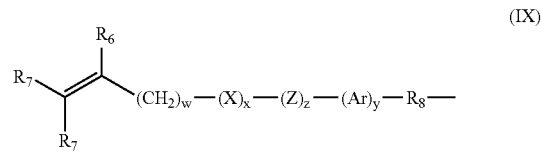
(IX)

wherein:

$R_6$ is hydrogen or methyl;

$R_7$ is hydrogen, an alkyl radical having from 1 to and including 6 carbon atoms, or a —CO—Y—$R_g$ radical wherein Y is —O—, —S— or —NH—;

$R_8$ is a divalent alkylene radical having from 1 to and including 10 carbon atoms;

$R_9$ is a alkyl radical having from 1 to and including 12 carbon atoms;

X denotes —CO— or —OCO—;

Z denotes —O— or —NH—;

Ar denotes a substituted or unsubstituted aromatic radical having from 6 to and including 30 carbon atoms;

w is from 0 to and including 6; x is 0 or 1; y is 0 or 1; and z is 0 or 1.

A more specific example of a silicone-containing urethane monomer is represented by Formula X:

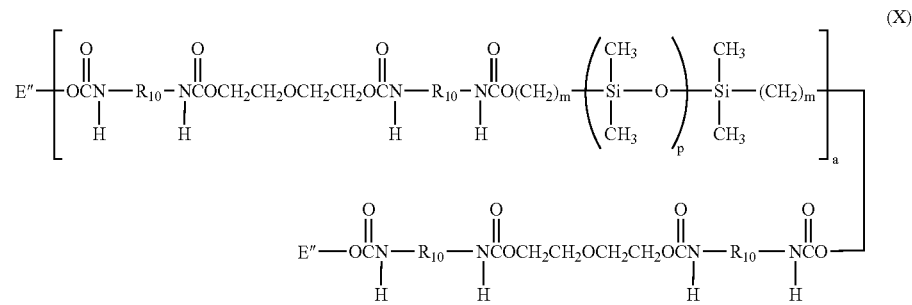
(X)

wherein m is at least 1 and is preferably 3 or 4, a is at least 1 and preferably is 1, p is a number which provides a moiety weight of 100 to 1,000 and is preferably chosen such that the monomer is in the liquid state at room temperature and about 1 atmosphere, $R_{10}$ is a diradical of a diisocyanate after removal of the isocyanate group, such as the diradical of isophorone diisocyanate, and each En is a group represented by:

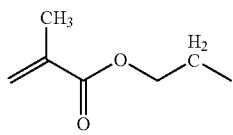

In a preferred embodiment, a siloxanyl-based monomer selected from among those described above is in the liquid state at room temperature and about 1 atmosphere.

In another aspect, the refractive indices of the poly(disubstituted acetylene) and the siloxanyl-based monomer or monomers are chosen such that the refractive indices of the poly(disubstituted acetylene) and the resulting siloxanyl-based polymer are substantially matched to produce a substantially optically clear polymeric material. For example, the refractive indices of the components are matched when they do not differ from one another by more than about 0.1 (or alternatively, about 0.05, or about 0.02).

In still another aspect, it may be desirable to include a hydrophilic monomer in a composition of the present invention in an amount such that the final polymeric material has a selected equilibrium water content.

Hydrophilic monomers can be nonionic monomers, such as 2-hydroxyethyl methacrylate ("HEMA"), 2-hydroxyethyl acrylate ("HEA"), 2-(2-ethoxyethoxy)ethyl (meth)acrylate, glyceryl (meth)acrylate, polyethylene glycol (meth)acrylate, tetrahydrofurfuryl (meth)acrylate, (meth)acrylamide, N,N'-dimethylmethacrylamide, N,N'-dimethylacrylamide, N-vinyl-2-pyrrolidone (or other N-vinyl lactams), N-vinylacetamide, and combinations thereof. Other hydrophilic monomers can have more than one polymerizable group, such as tetraethylene glycol (meth)acrylate, triethylene glycol (meth)acrylate, tripropylene glycol (meth)acrylate, ethoxylated bisphenol-A (meth)acrylate, pentaerythritol (meth)acrylate, pentaerythritol (meth)acrylate, ditrimethylolpropane (meth)acrylate, ethoxylated trimethylolpropane (meth)acrylate, dipentaerythritol (meth)acrylate, alkoxylated glyceryl (meth)acrylate. Still further examples of hydrophilic monomers are the vinyl carbonate and vinyl carbamate monomers disclosed in U.S. Pat. No. 5,070,215, and the hydrophilic oxazolone monomers disclosed in U.S. Pat. No. 4,910,277. The contents of these patents are incorporated herein by reference. The hydrophilic monomer also can be an anionic monomer, such as 2-methacryloyloxyethylsulfonate salts. Substituted anionic hydrophilic monomers, such as from acrylic and methacrylic acid, can also be utilized wherein the substituted group can be removed by a facile chemical process. Non-limiting examples of such substituted anionic hydrophilic monomers include trimethylsilyl esters of (meth) acrylic acid, which are hydrolyzed to regenerate an anionic carboxyl group. The hydrophilic monomer also can be a cationic monomer selected from the group consisting of 3-methacrylamidopropyl-N,N,N-trimethyammonium salts, 2-methacryloyloxyethyl-N,N,N-trimethylammonium salts, and amine-containing monomers, such as 3-methacrylamidopropyl-N,N-dimethylamine. Other suitable hydrophilic monomers will be apparent to one skilled in the art.

In still another aspect, it may be desirable to include a hydrophobic monomer in a composition of the present invention. Non-limiting examples of hydrophobic monomers are $C_1$-$C_{20}$ alkyl and $C_3$-$C_{20}$ cycloalkyl (meth)acrylates, substituted and unsubstituted aryl (meth)acrylates (wherein the aryl group comprises 6 to 36 carbon atoms), (meth)acrylonitrile, styrene, lower alkyl-substituted styrenes, lower alkyl vinyl ethers, and $C_2$-$C_{10}$ perfluoroalkyl (meth)acrylates and correspondingly partially fluorinated (meth)acrylates. Other examples of hydrophobic monomers are polysiloxanes having one or more fluorinated side groups (e.g., —$(CF_2)_x$—R'', wherein R'' is H, F, or lower alkyl; x is an integer, such as from 1 to 10). The fluorination of certain monomers used in a formulation of polysiloxanes has been indicated to reduce the accumulation of deposits on contact lenses made therefrom, as described in U.S. Pat. Nos. 4,954,587, 5,079,319 and 5,010,141, which are incorporated herein by reference.

A polymeric material of the present invention can comprise units of one or more materials selected from the group of crosslinking agents, strengthening agents, and/or radiation absorbers (such as ultraviolet ("UV") absorbers and/or absorbers of visible light in the wavelengths of violet and/or blue light). In addition, in carrying out a polymerization of the materials of the present invention, one or more polymerization initiators are desirably included in a starting mixture.

Non-limiting examples of suitable crosslinking agents include ethylene glycol dimethacrylate ("EGDMA"); diethylene glycol dimethacrylate; ethylene glycol diacrylate; triethylene glycol dimethacrylate; triethylene diacrylate; allyl methacrylates; allyl acrylates; 1,3-propanediol dimethacrylate; 1,3-propanediol diacrylate; 1,6-hexanediol dimethacrylate; 1,6-hexanediol diacrylate; 1,4-butanediol dimethacrylate; 1,4-butanediol diacrylate; trimethylolpropane trimethacrylate ("TMPTMA"); glycerol trimethacrylate; poly(ethyleneoxide mono- and di-acrylate); N,N'-dihydroxyethylene bisacrylamide; diallyl phthalate; triallyl cyanurate; divinylbenzene; ethylene glycol divinyl ether; N,N-methylene-bis-(meth)acrylamide; divinylbenzene; divinylsulfone; and the like.

Although not required, polymeric materials within the scope of the present invention may optionally have one or more strengthening agents added prior to polymerization, preferably in quantities of less than about 80 weight percent, but more typically from about 10 to about 60 weight percent, or from about 10 to about 30 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

Suitable UV light absorbers for use in the present invention include for example, but are not limited to, β(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl)benzotriazole; 2-(2'-hydroxy-5'-methacryloxyethylphenyl)-2H-benzotriazole; 2-[3'-tert-butyl-2'-hydroxy-5'-(3''-methacryloyloxypropyl)phenyl]-5-chlorobenzotriazole; 2-(3'-tert-butyl-5'-(3''-dimethylvinylsilylpropoxy)-2'-hydroxyphenyl]-5-methoxybenzotrazole; 2-(3'-allyl-2'-hydroxy-5'-methylphenyl)benzotriazole; 2-[3'-tert-butyl-2'-hydroxy-5'-(3''-methacryloyloxypropoxy)phenyl]-5-methoxybenzotriazole, and 2-[3'-tert-butyl-2'-hydroxy-5'-(3''-methacryloyloxypropoxy)phenyl]-5-chlorobenzotriazole. Preferably, the UV light absorber also has a polymerizable functional group. In one embodiment, the preferred UV light absorbers are β-(4-benzotriazoyl-3-hydroxyphenoxy)ethyl acrylate and 2-[3'-tert-butyl-2'-hydroxy-5'-(3''-methacryloyloxypropoxy)phenyl]-5-chlorobenzotriazole.

Suitable blue or violet light absorbers are the azo dyes. Non-limiting examples of azo dyes are disclosed in U.S. Pat. Nos. 6,878,792 and 5,470,932, each of which is incorporated herein by reference.

One or more suitable free radical polymerization initiators may be desirably added to a mixture of poly(disubstituted acetylene) and at least another siloxanyl-based monomer that is polymerizable via radical polymerization for making a polymeric material of the present invention. These initiators include thermal polymerization initiators and photopolymerization initiators. Thermal polymerization initiators include organic peroxy compounds and azobis(organonitrile) compounds. Non-limiting examples of suitable organic peroxy compounds include peroxymonocarbonate esters, such as tert-butylperoxy isopropyl carbonate; peroxydicarbonate esters, such as di(2-ethylhexyl) peroxydicarbonate, di(sec-butyl)peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as ter-butylperoxy pivalate, ter-butylperoxy octylate, and ter-butylperoxy isobutyrate; methylethylketone peroxide; and acetylcyclohexane sulfonyl peroxide. Non-limiting examples of suitable azobis(organonitrile) compounds include azobis(isobutyronitrile); 2,2'-azobis(2,4-dimethylpentanenitrile); 1,1'-azobiscyclohexanecarbonitrile; and azobis(2,4-dimethylvaleronitrile); and mixtures thereof. Preferably, such an initiator is employed in a concentration of approximately 0.01 to 1 percent by weight of the total mixture.

Representative UV photopolymerization initiators include those known in the field, such as the classes of benzophenone and its derivatives, benzoin ethers, and phosphine oxides. Some non-limiting examples of these initiators are benzophenone; 4,4'-bis(dimethylamino)benzophenone; 4,4'-dihydroxybenzophenone; 2,2-diethoxyacetophenone; 2,2-dimethoxy-2-phenylacetophenone; 4-(dimethylamino) benzophenone; 2,5-dimethylbenzophenone; 3,4-dimethybenzophenone; 4'-ethoxyacetophenone; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; 4'-phenoxyacetophenone; 2-methyl4'-(methylthio)-2-morpholinopropiophenone; benzoin methyl ether; benzoin ethyl ether; diphenyl(2,4,6-trimethylbenzoyl)phosphine oxide. These initiators are commercially available. Other photo polymerization initiators are known under the trade names Darocur™ and Irgacure™, such as Darocur™ 1173 (2-hydroxy-2-methyl-1-phenyl-1-propanone), Irgacure™ 651 (2,2-dimethoxy-2-phenylacetophenone), Irgacure™ 819 (phenyl-bis(2,4,6-trimethyl benzoyl)phosphine oxide), and Irgacure™ 184 (1-hydroxy cyclohexyl phenyl ketone) from Ciba-Geigy, Basel, Switzerland. Other desirable photopolymerization initiators are those activatable by visible light, for example, blue light.

In another aspect, the present invention provides a method for making a gas-permeable medical device, such as a contact lens. The method comprises: (a) preparing a mixture comprising poly(disubstituted acetylene) and at least a siloxanyl-based monomer in a solvent that is incapable of copolymerizing with said poly(disubstituted acetylene) and said at least a siloxanyl-based monomer; and (b) wet-casting the mixture in a mold, a cavity of which has a shape of said medical device.

In still another aspect, the mixture further comprises a hydrophilic monomer or a hydrophobic monomer, or both.

In yet another aspect, the mixture further comprises at least a polymerization initiator that is capable of initiating a polymerization of said at least a siloxanyl-based monomer. In various embodiments, the polymerization initiators are selected from those disclosed herein.

In still another aspect, the mixture further comprises one or more materials selected from the group consisting of UV radiation absorbers, crosslinking agents, and strengthening agents disclosed above.

In one embodiment, the solvent is capable of dissolving said poly(disubstituted acetylene). For example, such a solvent may be selected from non-polar solvents, such as toluene or xylene. The solvent may be removed from the finished lenses by evaporation under vacuum (preferably high vacuum) or by extraction with a more volatile solvent such as isopropanol. It may be desirable to carry out the evaporation under vacuum and at an elevated temperature, such as in the range from about 30° C. to about 100° C. (or from about 30° C. to about 80° C.).

In still another aspect, a method of making a gas-permeable medical device comprises: (a) forming a solid block of a polymeric material comprising poly(disubstituted acetylene) and at least a siloxanyl-based polymer; and (b) shaping the block to form the medical device. In one embodiment of the method, the step of shaping comprises: (1) cutting the block into wafers; and (2) machining or lathing the wafer into the form of the medical device. In one embodiment, the step of forming said solid block comprises wet-casting a mixture of said poly(disubstituted acetylene) and at least a siloxanyl-based monomer in a solvent. In one aspect, said poly(disubstituted acetylene) is dissolved in said solvent and said siloxanyl-based monomer is added to the solution.

In some embodiments, the polymeric material further comprises units of one or more additional hydrophilic monomers, hydrophobic monomers, or both. Such monomers can be selected from those disclosed herein above.

In some embodiments, the step of polymerizing a composition of the present invention is carried out at a temperature from about ambient temperature to about 120° C., or from about ambient temperature to about 100° C., in the presence of a thermal polymerization initiator. Alternatively, the step of polymerization can be carried out under irradiation, for example, UV or visible-light irradiation, in the presence of a photo polymerization initiator.

In a still another aspect, the medical device is further subjected to a surface treatment to provide a hydrophilic coating thereto.

In one embodiment, the surface treatment comprises: exposing the medical device to a plasma treatment sequentially under an oxidizing gas, a hydrocarbon, and then an oxidizing gas; and forming a coating comprising a hydrophilic polymer on the plasma-treated surface of the medical device. The medical device may be treated on both sides at once or each side sequentially.

Plasma processes are well known in the art and are disclosed in U.S. Pat. Nos. 4,143,949; 4,312,575; 5,464,667; and 6,902,812; the contents of these patents are incorporated herein by reference.

It is desirable first to create a population of surface reactive functional groups on the medical device, then attach a hydrophilic polymer chain thereto. In one embodiment, the attachment of the hydrophilic polymer is effected by forming covalent bonds between functional groups of the hydrophilic polymer and the surface reactive functional groups. In another embodiment, a nitrogen-containing gas (such as ammonia, ethylene diamine, $C_{1-8}$ alkyl amine, hydrazine, or other oxidizing compounds) is provided in the plasma chamber to form amine groups on the medical device surface. (However, oxygen or sulfur containing gases may alternatively be used to form oxygen or sulfur containing groups, for example hydroxy or sulfide groups or radicals, on the medical device surface.) This step of the treatment is performed for a period from about 10 seconds to about 10 minutes or more (preferably from about 1 to about 10 minutes) at a discharge frequency of 13.56 MHz at a power from about 10 to 1000 watts (preferably 20 to 500 watts), and at a pressure from about 10 Pa to about 130 Pa. Next, a hydrocarbon layer is deposited from a low-pressure plasma (from about 0.1 Pa to about 500 Pa) at a radio frequency of 13.56 MHz, at a power from about 10 to 1000 watts (preferably 20-400 watts) in about 30 seconds to about 10 minutes or more (preferably from about 30 seconds to about 3 minutes). Other plasma conditions may be suitable as will be understood by the skilled artisan, for example, using pulsed plasma. The thickness of the hydrocarbon layer should be less than about 50 nm, preferably between about 2 and about 50 nm (preferably between about 5 and 20 nm), as determined by XPS analysis. The use of $C_{1-10}$ hydrocarbons for the purpose of forming such a hydrocarbon layer is advantageous for its controllability in terms of thickness, deposition rate, hardness, etc. $C_{4-8}$ hydrocarbons (for example, butane, butene, isobutylene, 1,3-butadiene, and isoprene) are preferred.

Next, the hydrocarbon layer is rendered reactive (functionalized) to promote the covalent attachment of the hydrophilic polymer to the surface. Conditions and materials similar to those used in the first plasma oxidation step disclosed above can be used.

The hydrophilic polymer may be the reaction product of monomers comprising one or more non-reactive hydrophilic monomers and one or more reactive functional monomers. In this case, the reactive functional monomeric unit will complementarily react with a surface having reactive functionalities, for example, as provided by plasma oxidation. Such reactive functional monomers may include monomers containing one or more of the following groups: isocyanate, or various ring-opening reactive groups, for example, azlactone, epoxy, acid anhydrides, and the like. The hydrophilic polymers may be homopolymers or copolymers comprising reactive monomeric units that contain either an isocyanate or a ring-opening reactive functionality optionally. Although these reactive monomeric units may also be hydrophilic, the hydrophilic polymer may also be a copolymer of reactive monomeric units copolymerized with one or more various non-reactive hydrophilic monomeric units. A small number of hydrophobic monomeric units may optionally be present in the hydrophilic polymer, and in fact may be advantageous in providing a thicker coating by promoting the aggregation of the hydrophilic reactive polymer in solution. The ring-opening monomers include azlactone-, epoxy-, and acid anhydride-functionalized monomers. Hydrophilic monomers may be of the aprotic type such as acrylamides (N,N-dimethylacrylamide, "DMA"), lactones such as N-vinylpyrrolidinone, and poly(alkylene oxide) such as methoxypolyoxyethylene methacrylates or may be of the protic type such as methacrylic acid or hydroxyalkyl methacrylates such as hydroxyethyl methacrylate ("HEMA").

For example, an epoxy-functionalized hydrophilic polymer for coating a lens can be a copolymer containing glycidyl methacrylate ("GMA") monomeric units which will react with amine reactive functionalities or the like on the surface hydrocarbon layer. Preferred examples of anhydride-functionalized hydrophilic polymers comprise monomeric units derived from monomers such as maleic anhydride and itaconic anhydride. In general, epoxy functional groups or anhydride functional groups in the hydrophilic polymer react with the primary amine ($-NH_2$) groups or hydroxyl groups formed by plasma-oxidation on the surface hydrocarbon layer. Although amine reactive functionalities are preferred, oxygen-containing groups may be employed, preferably in the presence of an acidic catalyst such as 4-dimethylaminopyridine, to speed the reaction at room temperature, as will be understood by the skilled chemist. In general, azlactone or isocyanate functional groups in the hydrophilic polymers may similarly react with amine or hydroxy functional groups on the surface hydrocarbon layer.

A hydrophilic coating, as disclosed herein, can provide more comfort to the user of the medical device. For example, such a hydrophilic coating on a contact lens allows tear to flow more easily between the posterior surface of the lens and the cornea, providing better lubrication of the cornea.

As an example, a coating comprising a hydrophilic polymer that includes units of GMA and DMA is attached to the amine-functionalized surface of a contact lens according to Scheme 1.

Scheme 1

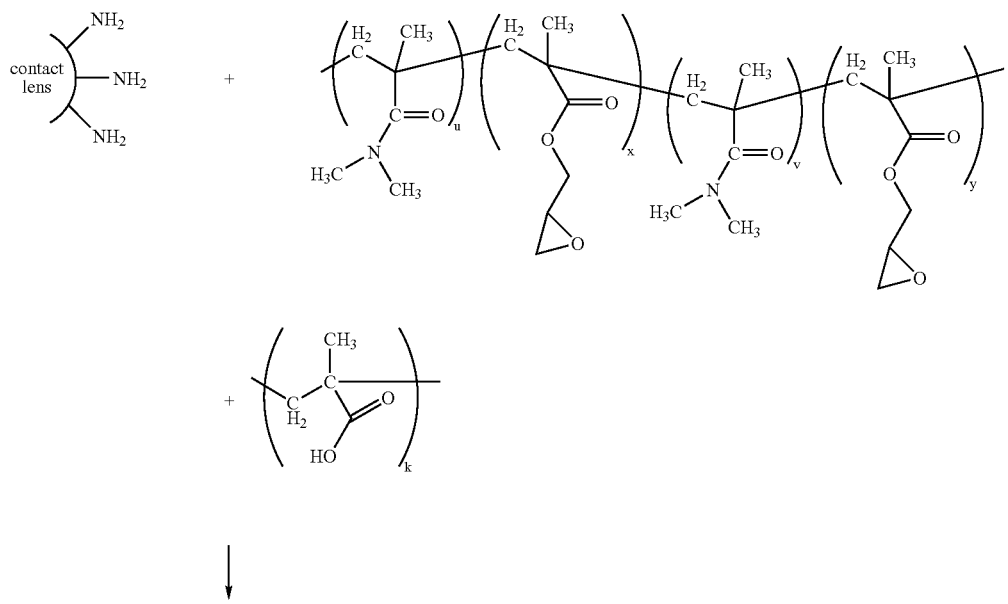

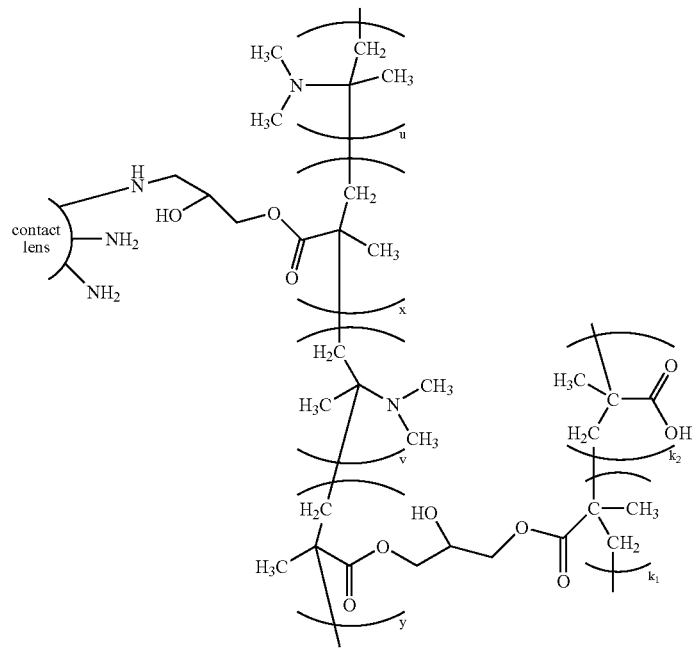

wherein u, v, x, y, k, $k_1$, and $k_2$ are integers such that the hydrophilic polymers are preferably soluble in water; and $k=k_1+k_2$.

As another example, a coating comprising a hydrophilic polymer that includes units of isocyanatoethylmethacrylate and methacrylic acid is attached to the amine-functionalized surface of a contact lens according to Scheme 2.

Scheme 2

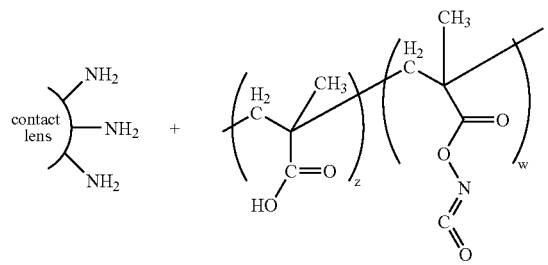

↓

-continued

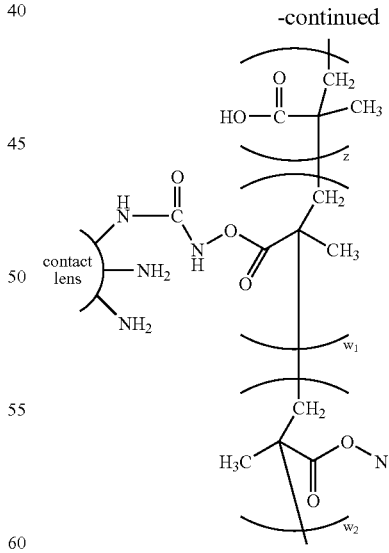

wherein z, w, $w_1$, and $w_2$ are integers such that the hydrophilic polymer is preferably water soluble, and $w=w_1+w_2$.

While specific embodiments of the present invention have been described in the foregoing, it will be appreciated by those skilled in the art that many equivalents, modifications, substitutions, and variations may be made thereto without departing from the spirit and scope of the invention as defined in the appended claims.

What is claimed is:

1. A polymeric material comprising a poly(disubstituted acetylene) and a siloxanyl-based polymer, wherein the poly(disubstituted acetylene) has a formula of

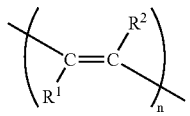

(I)

wherein the group $R^1$ of different repeating units is independently selected from the group consisting of lower alkyl, substituted lower alkyl, $C_{6-36}$ aryl, and $C_{6-36}$ substituted aryl, and some or all of the $R^1$ groups are trifluoromethyl; $R^2$ comprises a substituted silyl group having a formula of

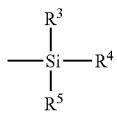

(II)

wherein $R^3$, $R^4$, and $R^5$ are independently selected from the group consisting of lower alkyl, substituted lower alkyl, $C_{6-36}$ aryl, and $C_{6-36}$ substituted aryl; and n is a positive integer in the range from about 20 to about 500.

2. The polymeric material of claim 1, wherein the $R^1$ groups are independently selected from the group consisting of trifluoromethyl, lower alkyl and substituted lower alkyl groups.

3. The polymeric material of claim 1, wherein said aryl groups are selected from the group consisting of phenyl, biphenyl, naphthyl, benzyl, anthryl, and combinations thereof.

4. The polymeric material of claim 1, wherein at least some of the $R^1$ groups are methyl or phenyl.

5. The polymeric material of claim 4, wherein said $R^3$, $R^4$, and $R^5$ are independently selected from the group consisting of methyl and phenyl groups.

6. The polymeric material of claim 1, wherein the siloxanyl-based polymer comprises a polymerization product of at least one of vinyl-, (meth)acrylate-, hydride-, epoxy-, hydroxyl-, and amino-terminated siloxanes having from 1 to about 20 siloxy units.

7. The polymeric material of claim 6, wherein substituents on said siloxy units are selected from the group consisting of substituted and unsubstituted lower alkyl, and substituted and unsubstituted $C_{6-36}$ aryl groups.

8. The polymeric material of claim 1, wherein the siloxanyl-based polymer comprises a polymerization product of tris(trimethylsiloxy)silylpropyl methacrylate ("TRIS").

9. The polymeric material of claim 1, wherein the siloxanyl-based polymer comprises a polymerization product of a vinyl carbonate or vinyl carbamate siloxane-containing macromonomer.

10. The polymeric material of claim 1, wherein the siloxanyl-based polymer comprises a copolymer of polyurethane and polysiloxane.

11. A medical device comprising a poly(disubstituted acetylene) and a siloxanyl-based polymer, wherein the poly(disubstituted acetylene) has a formula of

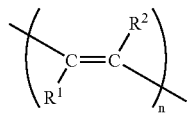

(I)

wherein the group $R^1$ of different repeating units is independently selected from the group consisting of lower alkyl, substituted lower alkyl, $C_{6-36}$ aryl, and $C_{6-36}$ substituted aryl, and some or all of the $R^1$ groups are trifluoromethyl; $R^2$ comprises a substituted silyl group having a formula of

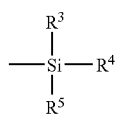

(II)

wherein $R^3$, $R^4$, and $R^5$ are independently selected from the group consisting of lower alkyl, substituted lower alkyl, $C_{6-36}$ aryl, and $C_{6-36}$ substituted aryl; and n is a positive integer in the range from about 20 to about 500, and the medical device is an ophthalmic device.

12. The medical device of claim 11, wherein the $R^1$ groups are independently selected from the group consisting of lower alkyl and substituted lower alkyl groups.

13. The medical device of claim 11, wherein said aryl groups are selected from the group consisting of phenyl, biphenyl, naphthyl, benzyl, anthryl, and combinations thereof.

14. The medical device of claim 11, wherein at least some of the $R^1$ groups are methyl or phenyl.

15. The medical device of claim 14, wherein said $R^3$, $R^4$, and $R^5$ are independently selected from the group consisting of methyl and phenyl groups.

16. The medical device of claim 11, wherein the siloxanyl-based polymer comprises a polymerization product of at least one of vinyl-, (meth)acrylate-, hydride-, epoxy-, hydroxyl-, and amino-terminated siloxanes having from 1 to about 20 siloxy units.

17. The medical device of claim 16, wherein substituents on said siloxy units are selected from the group consisting of substituted and unsubstituted lower alkyl, and substituted and unsubstituted $C_{6-36}$ aryl groups.

18. The medical device of claim 16, wherein substituents on said siloxy units are selected from the group consisting of substituted and unsubstituted $C_{1-3}$ alkyl, phenyl, and substituted phenyl groups.

19. The medical device of claim 11, wherein the siloxanyl-based polymer comprises a polymerization product of tris(trimethylsiloxy)silylpropyl methacrylate ("TRIS").

20. The medical device of claim 19, wherein the medical device further comprises units of a hydrophilic monomer, a hydrophobic monomer, or both.

21. The medical device of claim 11, wherein the siloxanyl-based polymer comprises a polymerization product of a vinyl carbonate or vinyl carbamate siloxane-containing macromonomer.

22. The medical device of claim 11, wherein the siloxanyl-based polymer comprises a copolymer of polyurethane and polysiloxane.

23. The medical device of claim 11, further comprising units of a radiation absorber.

24. The medical device of claim 23, wherein the radiation absorber is capable of absorbing at least a portion of UV radiation or visible light having wavelengths in a range of violet or blue light.

25. The medical device of claim 11, wherein the medical device has an oxygen permeability (Dk) in a range from about 140 to about 1000 barrers.

26. The medical device of claim 11, wherein the medical device has an oxygen permeability (Dk) in a range from about 160 to about 300 barrers.

27. A method for making a gas-permeable contact lens, the method comprising:

forming a solid block of a polymeric material comprising poly(disubstituted acetylene) and at least a siloxanyl-based polymer, wherein the poly(disubstituted acetylene) has a formula of

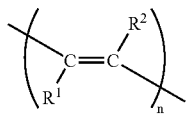

(I)

wherein the group $R^1$ of different repeating units is independently selected from the group consisting of lower alkyl, substituted lower alkyl, $C_{6-36}$ aryl, and $C_{6-36}$ substituted aryl, and some or all of the $R^1$ groups are trifluoromethyl; $R^2$ comprises a substituted silyl group having a formula of

(II)

wherein $R^3$, $R^4$, and $R^5$ are independently selected from the group consisting of lower alkyl, substituted lower alkyl, $C_{6-36}$ aryl, and $C_{6-36}$ substituted aryl; and n is a positive integer in the range from about 20 to about 500; and shaping the block to form the contact lens.

28. The method of claim 27, wherein the step of shaping comprises: (1) cuffing the block into wafers; and (2) machining or lathing the wafer into the form of the contact lens.

29. The method of claim 27, further comprising forming a hydrophilic coating on said contact lens.

30. The method of claim 29, wherein the step of forming said hydrophilic coating comprises creating a plurality of surface reactive functional groups on a surface of the contact lens and attaching a hydrophilic polymer thereto.

31. The method of claim 30, wherein the step of creating a plurality of surface reactive functional groups on a surface of the contact lens is effected by exposing the medical device surface to a plasma containing an oxidizing gas.

* * * * *